United States Patent
Rangarajan et al.

(10) Patent No.: US 6,757,544 B2
(45) Date of Patent: Jun. 29, 2004

(54) SYSTEM AND METHOD FOR DETERMINING A LOCATION RELEVANT TO A COMMUNICATION DEVICE AND/OR ITS ASSOCIATED USER

(75) Inventors: Jayanthi Rangarajan, Naperville, IL (US); David Ladd, Downers Grove, IL (US); Senaka Balasuriya, Westmont, IL (US); Curtis Tuckey, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/930,049

(22) Filed: Aug. 15, 2001

(65) Prior Publication Data

US 2003/0050075 A1 Mar. 13, 2003

(Under 37 CFR 1.47)

(51) Int. Cl.[7] .................................................. H04Q 7/20
(52) U.S. Cl. ................ 455/456.1; 455/414.2; 455/414.3; 455/404.1
(58) Field of Search ............................. 455/456.1, 457, 455/414.1–414.3, 404.1, 456.2, 404.2, 522.1, 456.3; 342/357.01–357.06, 357.08, 357.09, 357.1–357.17; 701/207–210, 213, 214, 200

(56) References Cited

U.S. PATENT DOCUMENTS

| | | | | |
|---|---|---|---|---|
| 5,469,573 A | | 11/1995 | McGill, III et al. | |
| 5,596,313 A | * | 1/1997 | Berglund et al. | 340/574 |
| 5,724,660 A | * | 3/1998 | Kauser et al. | 455/456 |
| 5,799,147 A | | 8/1998 | Shannon | |
| 5,895,436 A | * | 4/1999 | Savoie et al. | 701/214 |
| 6,029,069 A | * | 2/2000 | Takaki | 455/456 |
| 6,138,026 A | * | 10/2000 | Irvin | 455/456 |
| 6,148,211 A | * | 11/2000 | Reed et al. | 455/456 |
| 6,243,039 B1 | * | 6/2001 | Elliot | 342/457 |
| 6,292,666 B1 | * | 9/2001 | Siddiqui et al. | 455/456 |
| 6,526,268 B1 | * | 2/2003 | Marrah et al. | 455/456 |
| 6,526,275 B1 | * | 2/2003 | Calvert | 455/418 |
| 6,535,164 B2 | * | 3/2003 | Imazeki et al. | 342/357.17 |

FOREIGN PATENT DOCUMENTS

WO        WO 00/04730        1/2000

* cited by examiner

Primary Examiner—Erika Gary
(74) Attorney, Agent, or Firm—Randall S. Vaas; Hisashi D. Watanabe

(57) ABSTRACT

A method of determining a location relevant to a user of a communication device is provided. The method involves determining general location information of the location relevant to the user and determining a list of location parameters from the general location information. Specific location of the communication device is also determined. The location relevant to the user is then determined by comparing the list of location parameters with the specific location information. Systems and programs for using the method are also provided.

10 Claims, 4 Drawing Sheets

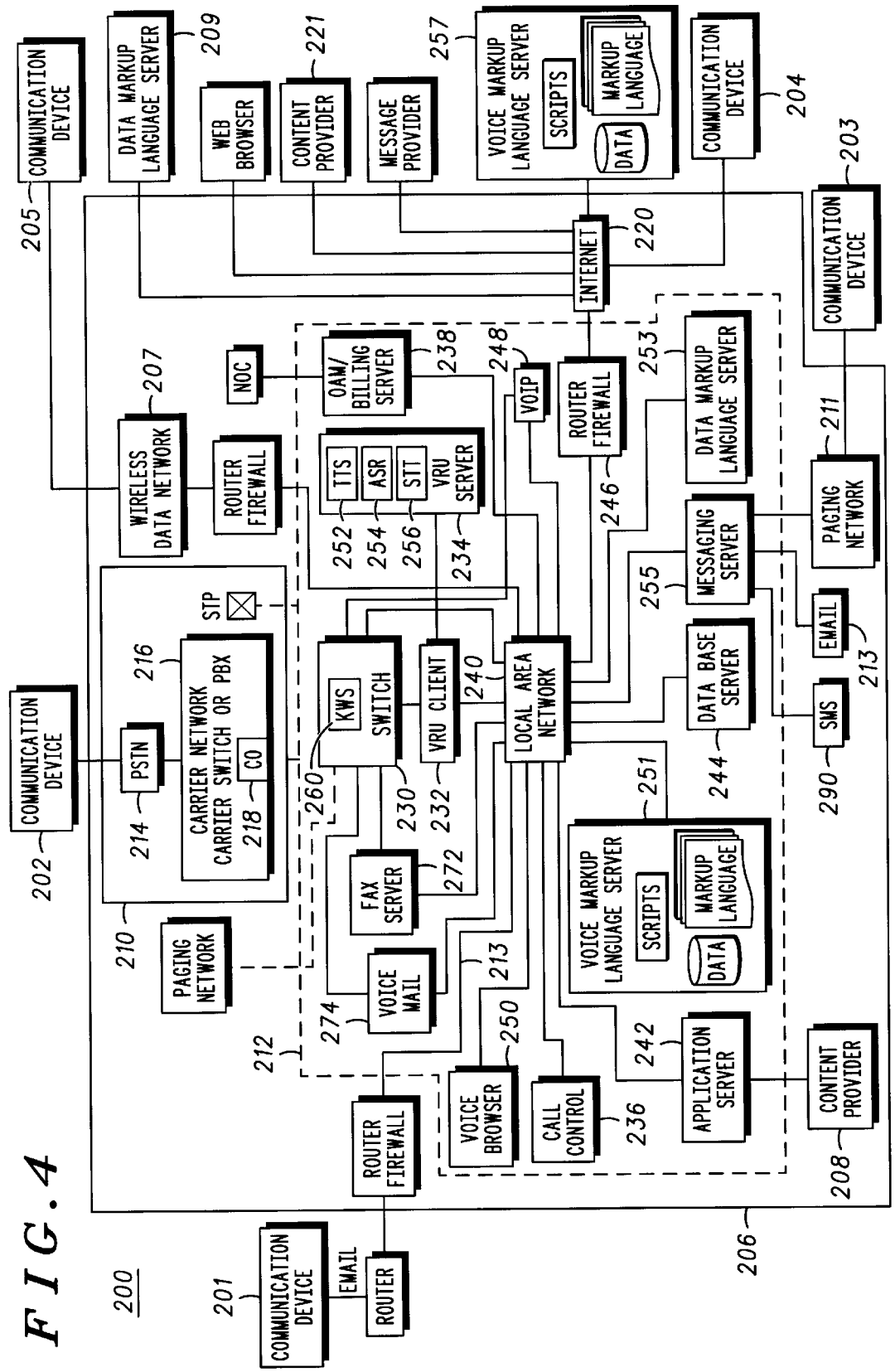

SYSTEM AND METHOD FOR DETERMINING A LOCATION RELEVANT TO A COMMUNICATION DEVICE AND/OR ITS ASSOCIATED USER

FIELD OF THE INVENTION

The present invention relates generally to communication systems. More particularly, the present invention relates to methods and systems for determining a location relevant to a communication device or a location relevant to a user associated with a communication device.

BACKGROUND OF THE INVENTION

Wireless telephones, pagers and other communication devices typically communicate via wireless telecommunications networks. In recent years, a number of service systems have been implemented or proposed for wireless telecommunications networks which would provide a given service based on the locations of the devices communicating via these networks. Such location-based service systems would provide a service in relation to a given location. For example, such a service could locate the nearest ATM, gas station, bank, police station, or restaurant, in relation to the location.

Generally, the location relevant to the service is the location of the communication device, or specifically the location of the wireless transceiver. This location may be determined using automatic position determination technology such as cell and sector identification and GPS. However, different position determination technologies provide different levels of location accuracy.

For example, cell and sector identification locates a wireless transceiver to a general area such as that covered by a single base station. Moreover, cell and sector identification-based positioning is inadequate to accurately identify one specific location. Meanwhile, GPS can accurately locate a wireless transceiver in open, unobstructed environments. However, GPS presents technological challenges to identifying a location in an obstructed environment such as a city.

A location may also be determined using information input by the user. However, user-specified location may be inefficient. If the information is input as speech (e.g. a location spoken into a cellular phone), the location may be difficult to recognize, primarily due to constraints in speech recognition technology.

It would be desirable therefore, to provide an improved method for determining a location.

BRIEF DESCRIPTION OF THE DRAWINGS

FIG. 4 is an exemplary block diagram illustrating another embodiment of a communication system.

DETAILED DESCRIPTION OF THE PRESENTLY PREFERRED EMBODIMENTS

Desired location information can be identified from general location information and specific location information. For example a user might connect with a network operator and request the nearest automated teller machine (ATM). A general location of the user can first be determined. For example, where the device is a cellular phone, the general location can be identified by the location of the base station communicating with the cell phone. The locations within the base station's cell can then be used for determining the actual location of the user. The process can be automated through a voice recognition or text entry system.

Figure 1:
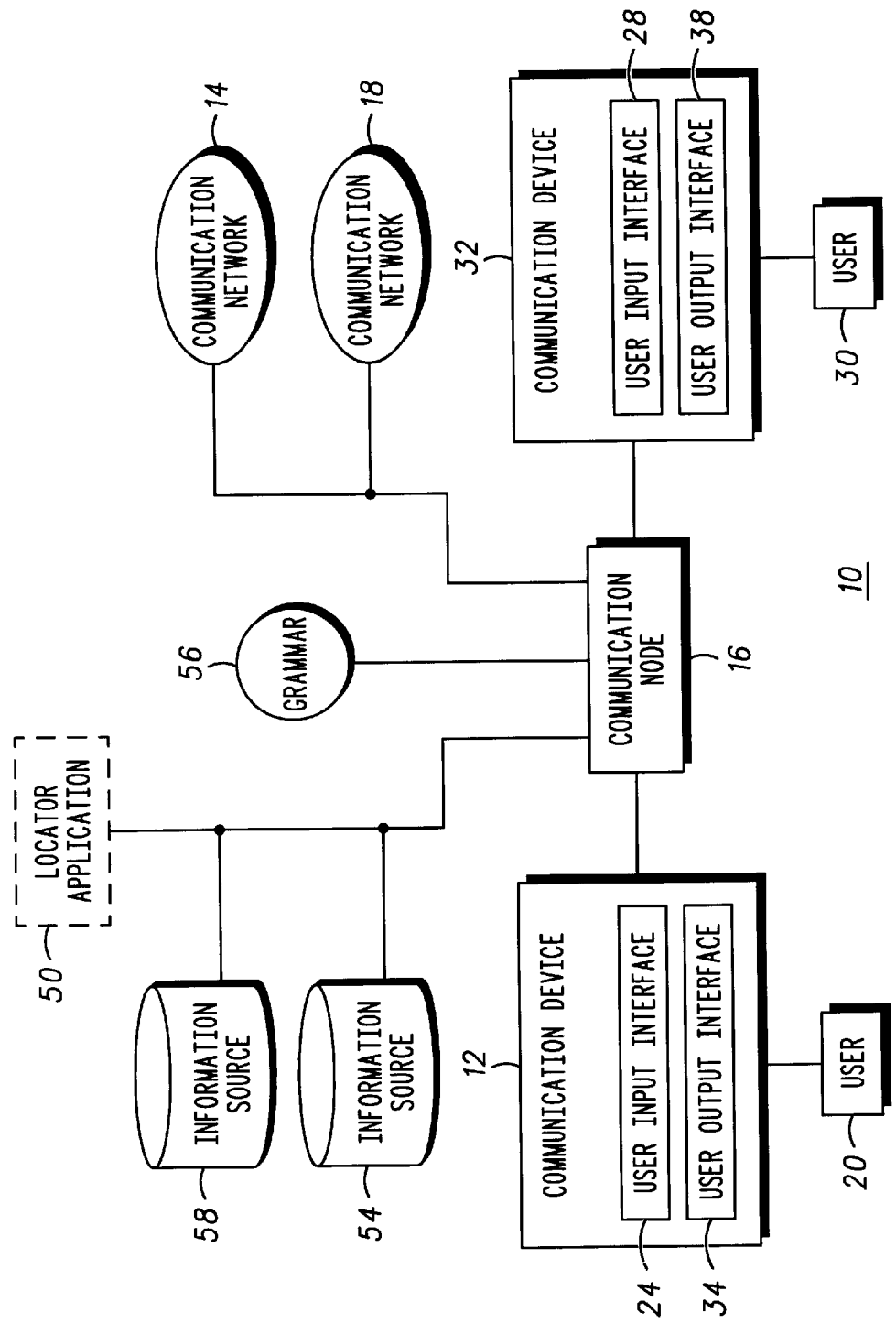
FIG. 1 is a block diagram illustrating a communication system.

FIG. 1 illustrates one embodiment of a communication system at 10. The communication system 10 generally includes a communication device 12, 32, communication networks 14, 18, a locator application 50 and a communication node 16. Communication system 10 may further include one or more information sources 54, 58 in communication with the locator application 50 and/or communication node 16. As further described below, the communication system 10 may provide various services and capabilities to cellular users, wire-line telephone users, paging users, satellite users, mobile or portable telephone users, trunked users, computer network users (e.g., Internet or Intranet users), wireless data users, branch office users, cable users and the like. Communication system 10 may also accurately locate communication device 12, 32 and/or its associated user 20, 30 in order to provide location-relevant services to the user 20, 30 via device 12, 32.

Locator application 50 may include one or more programs or other applications for processing location information. Locator application 50 may comprise computer readable/processable program code. Such location information may be information input by user 20, 30 via device 12, 32. Alternatively, location information processed by locator application 50 may be information provided by communication node 16 or forwarded by communication node from communication networks 14,18. Location information processed by locator application 50 may also be provided by information sources 54, 58. Locator application 50 may interact with user 20, 30 via device 12, 32. In one embodiment of the invention, locator application 50 resides on communication node 16. In another embodiment, locator application 50 is in communication with communication node 16. In yet another embodiment, locator application 50 may reside on communication device 12, 32.

Locator application 50 may process information from one or more information sources 54, 58. Information source 54, 58 may be operated by any entity, including, without limitation, a governmental agency, a commercial entity, or any other source of location information. In the present invention, each information source 54, 58 may contain geographical information and other information relating to the purpose of the present invention. In one embodiment, information source 54, 58 may comprise cellular and sector identification information. Information source 54, 58 may also include maps relating to such cellular and sector identification information. Additionally, information source 54, 58 may contain geographical and non-geographical information, including information that relates cellular and sector information to other geographical information. Information source 54, 58 may also include geographical and non-geographical information about countries, states/provinces, counties/parishes, metropolitan areas, cities, ZIP codes, area codes, landmarks, points of interest, subway and train stations, airports, streets, gas stations, Automated Teller Machines (ATMs), hospitals, police stations, restaurants, etc. In one embodiment, information source 54, 58 may comprise a virtual map of a given area, complete with a listing of all geographical entities on the map, such as a listing of all streets within Chicago, Ill., for example. One or more of information sources 54, 58 may also include such information as names and addresses. Information sources 54, 58 may contain specific names and addresses (e.g. a list of hospital names and their addresses) or may be a more general address listing (e.g. an electronic "yellow pages"). In one embodiment the information within information source 54, 58 may be contained in a database. Alternatively, information source 54, 58 may contain a grammar of geographical and non-geographical information for voice recognition purposes.

The communication device 12, 32 of the communication system 10 may be utilized by end user 20, 30 to access and/or connect with the communication node 16. Communication device 12, 32 may also be used by end user 20, 30 to access and/or connect with locator application 50. The communication device 12, 32 can include, but is not limited to, wireline telephones, mobile telephones, paging units, radio units, wireless data devices, Web telephones, portable or wireless telephones, personal information managers (PIMs), personal digital assistants (PDAs), personal computers (PCs), network televisions (TVs), Internet TVs, Internet telephones, portable wireless devices (i.e., two-way pagers), security systems (both mobile and premises-based), workstations or any other suitable communication devices.

Regardless of its specific form, the communication devices 12, 32 have user-input interfaces 24, 28 and/or user-output interfaces 34, 38. Alternatively, the user-input interfaces 24, 28 and/or user-output interfaces 34, 38 may work in conjunction with the communication device 12, 32 without actually residing on the device 12, 32.

The user-input interfaces 24, 28 may receive input from the users 20, 30 and the user-output interfaces 34, 38 may provide output to the users 20, 30. The user-input interfaces 24, 28 can include, but are not limited to, an electroacoustic transducer, such as, for example, a microphone to receive voice and other audible input from the users 20, 30 a keypad or a keyboard to receive key strokes from the users 20, 30 a touchpad or touchscreen to receive touch input from the users 20, 30 a handwriting recognition interface to receive handwritten input from users 20, 30 and a pointing device such as a mouse or a trackball to receive point and click inputs from the users 20, 30. In one embodiment of the present invention, user-input interface 24, 28 may be a modified car dashboard allowing input from users 20, 30.

The user-output interfaces 34, 38 of the communication devices 12, 32 can include, but are not limited to, an electroacoustic transducer such as, for example, a speaker to provide voice and other audible output to the users 20, 30, and a visual display device such as a liquid crystal display or a cathode ray tube to provide graphical and/or textual information to the users 20, 30. In one embodiment of the present invention, user-output interface 34, 38 may be a modified car dashboard providing output to users 20, 30.

Each of the communication devices 12, 32 may include more than one user-input interface 24, 28 or more than one user-output interface 34, 38. Moreover, the user may use one or more user-input interfaces 24, 28 or user-output interfaces 34, 38 simultaneously. For example, a wireless telephone may have a microphone, a telephone keypad, a speaker, and a visual display device.

In one embodiment of the invention, an input interface 24, 28 may also reside on the communication node 16. Output interface 34, 38 may also reside on the communication node 16. Alternatively, input interface 24, 28 may reside on the communication node 16 while output interface 34, 38 resides on the device 12, 32. Alternatively, input interface 24, 28 may reside on the device 12, 32 while output interface 34, 38 resides on communication node 16.

The communication device 12, 32 may also communicate with communication networks 14, 18 via the communication node 16. The communication network 14 can interface with the communication device 12, 32 through wireline or wireless networks or systems (i.e., telephone or televisions systems, Integrated Services Digital Network (ISDN) systems, coaxial lines, computer networks, digital end user lines, private networks, wireless local loop systems, etc.).

The communication networks 14, 18 of the communication system 10 can include, but are not limited to, intranets, extranets, the Internet, a Local Area Network (LAN), a telephone network, (e.g., a Public Switched Telephone Network (PSTN), private telephone networks, etc.), a cellular network, satellite networks, a personal communication system, a TV network (e.g., a cable TV system), local, regional, national or global paging networks, an email system, a wireless data network (e.g., satellite data or local wireless data networks), a wireless LAN, a wireless local loop/distribution system (e.g., LMDS, MMDS or Code Division Multiple Access (CDMA) based system), a Voice Over Internet Protocol (VOIP) network, or any other suitable network. The communication networks 14, 18 can also include a wide area network (WAN), such as, for example, the Internet, the World Wide Web (WWW) or any other similar on-line service. It will be recognized that the communication networks 14, 18 may have portions in common, may comprise two separate networks, or may be the same network.

The communication node 16 of the communication system 10 can include, but is not limited to, an interactive voice response node, a server computer, the MIX™ platform and the Myosphere™ Service provided by Motorola, Inc. of Schaumburg, Ill. (as further described with reference to FIG. 4), or other suitable system. It will be recognized that the communication node 16 may be integrated within or may be remote from the communication networks 14, 18.

Figure 2:
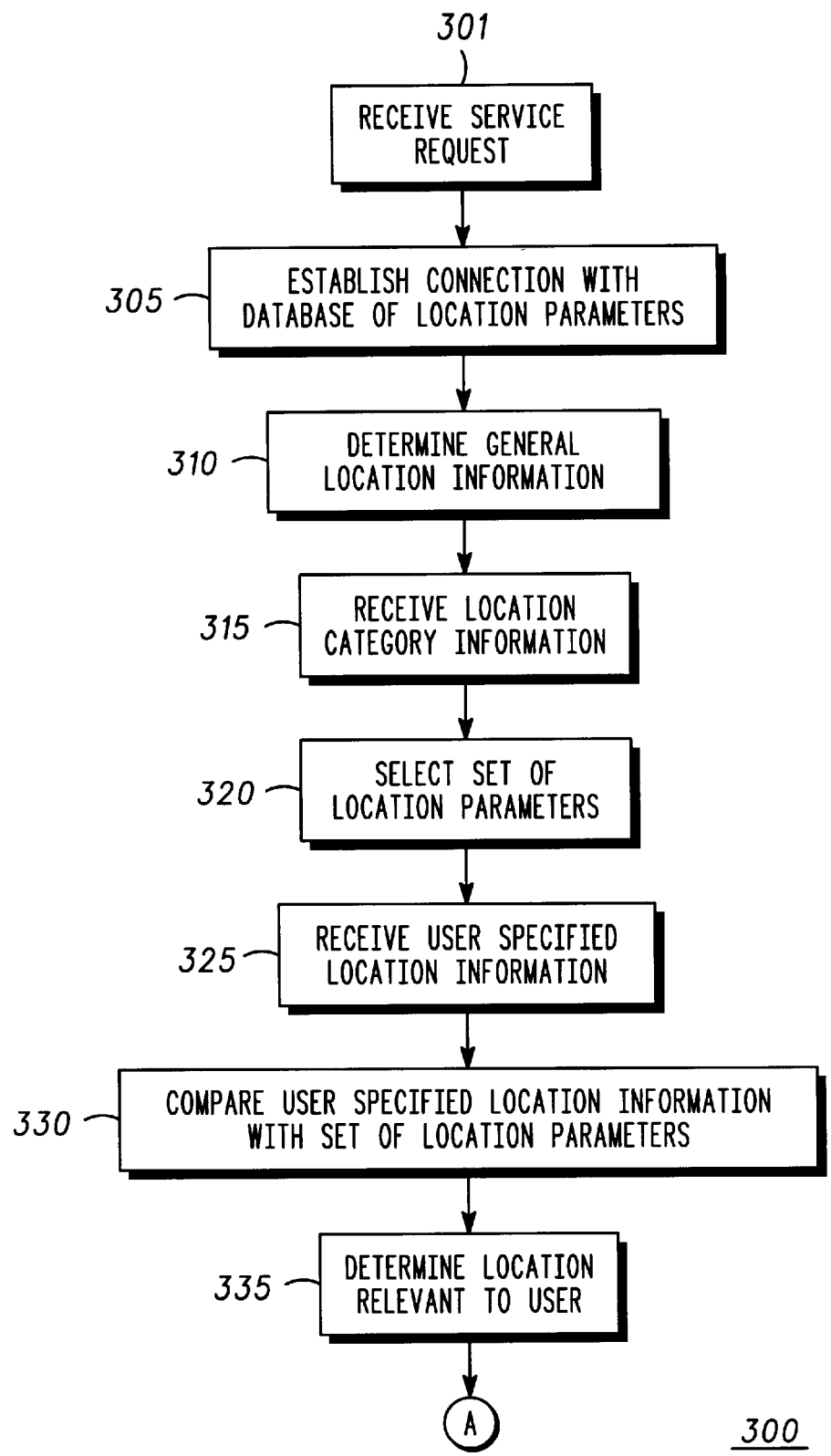
FIG. 2 is a flow diagram illustrating a method for determining the location relevant to a communication device or a location relevant to an associated user of a communication device.

FIG. 2 shows a flow diagram of one embodiment of a method for determining the location of a communication device or its associated user in accordance with the present invention at 300. In the embodiment shown in FIG. 2, locator application 50 resides on node 16. However, as described above, locator application 50 may be in communication with node 16 or on device 12, 32.

At block 301, a service request is received by locator application 50 on node 16. The service request may comprise a request to determine the location of the communication device 12, 32 and its associated user 20, 30. In one embodiment of the invention, the service request received by communication node 16 (or locator application 50) at block 301 may include information that enables the communication node 16 to automatically determine the general location of the communication device 12, 32 and/or its associated user 20, 30. For example, the general location of the device 12, 32 and its associated user 20, 30 may be a cell ID, a sector ID or a cell and sector ID (e.g. cell sector ID 12, 1234). The service request may also include input from user 20, 30 indicating additional specific location information. For example, the specific location may be in the form of a specific street address (e.g. 25 South LaSalle Street). The specification location may also be in the form of an intersection, a highway/exit, a highway/mile marker, a street name combined with a street number, the name of a landmark, a point of interest, the name of a place of business or any combination thereof (e.g. an intersection combined with a highway/exit, a highway/exit combined with a highway/mile marker, a landmark combined with a point of interest, or a point of interest combined with a place of business.)

In one embodiment of the invention, user 20, 30 may initiate the service request. Alternatively, the service request may be initiated by another communication device, the communication node 16 or another entity and then sent to the communication device 12, 32. The service request may be transmitted via a Voice User Interface (VUI), Device User Interface (DUI), a Graphic User Interface (GUI), or a combination thereof, each of which are known in the art.

Using VUI technology, the user may access one or more services enabled by communication node 16 via the input of voice commands, which will preferably be compared with an instruction set or a grammar located on the communication node 16. Once the service enabled by the communication node is invoked using VUI technology, the user 20, 30 may be prompted to act through a series of menus, in which the user responds through voice commands.

Using DUI technology, the user may access one or more services enabled by communication node 16 through the use of inputs via a keypad, mouse, stylus or handwriting input interface of the communication device 12, 32, which may, for example, be transmitted in the form of data such as WAP text or DTMF signals of the communication device 12, 32 in response to signals from the communication device 12, 32.

Using GUI technology, the user can access one or more of the services enabled by communication node 16 through the use of inputs. The inputs may be in response to prompts given to the user via a screen integral to or in conjunction with the communication device 12, 32 such as, for example, a display screen on a computer. The GUI technology may direct the user through a series of graphical displays. The GUI technology may also prompt the user for responses to those displays.

At block 305, locator application 50 on node 16 establishes an electronic connection with an information source 54. Locator application 50 may communicate with the information source 54 to obtain additional information for processing the request received at 301. In the embodiment of FIG. 2, this information source may be a database of location parameters. Thus, at block 305, the communication node initiates a communication link with the database of location parameters. The database of location parameters may be, for example, a memory location, located either integral with or remote from the communication node. Alternatively, information source 54 may be any suitable source of information that enables locator application 50 to pinpoint the location of device 12, 32 and its associated user 20, 30.

For example, information source 54 may provide a street map of a given cell and/or sector (e.g. a street map of cell and/or sector ID 1234). Location parameters that may be provided by information source 54 include, but are not limited to: lists of streets within a city; lists of streets within a cell or sector; lists of streets within a state; lists of street names and numbers; ZIP code lists; lists of street intersections; lists of landmarks in a given city, state, cell or sector; lists of places of interests in a given city, state, cell or sector; lists of banks in a given city, state, cell or sector; lists of restaurants in a given city, state, cell or sector; lists of hotels in a given city, state, cell or sector; lists of post offices in a given city, state, cell or sector; lists of businesses of a given type in a given city, state, cell or sector, etc. Information source 54 may also provide location parameters that comprise combinations of one or more of the parameters listed above e.g. lists of streets and cities or lists of countries and ZIP codes.

At block 310, the communication node 16 may then determine general location information corresponding to the location of the communication device 12, 32 and its associated user 20, 30. As described above at block 301, this general location information may have been sent automatically with the service request. Alternatively, general location information may be may be user-specified using any suitable technology, such as, for example, DUI, VUI or GUI methods described above.

General location information may also be determined automatically using any suitable technology such as position determination technology. Some examples of automatic positioning technology include, but are not limited to: cell identification information, sector identification information, timing advance information, triangulation information, receive level information, neighbor cell identification information, neighbor sector identification information, Global Positioning System (GPS) information, Assisted Global Positioning System (AGPS) information, Differential Global Positioning System (DGPS) information, Enhanced Observed Time Difference (EOTD) information, Forward Link Triangulation (FLT) information, Advanced Forward Link Triangulation (AFLT) information, Time Difference of Arrival (TDOA) information, Angle of Arrival (AOA) information, Idle Period DownLink Observed Time Difference of Arrival (IPDL-OTDOA) information. One or more of these technologies may be combined to determine general location information. Some combinations that may be used include, but are not limited to: cell combined with sector identification information, neighbor cell combined with neighbor sector information and cell and sector identification information combined with timing advance information.

General location information may be determined from or may include, for example, cell and/or sector identification and other geographic and non-geographic information such as a ZIP code, the city, state and country of a location, a telephone area code, etc. Such general location information may be obtained by querying the communication device 12, 32, by querying one or more communication networks 24, 28 or by querying any suitable entity, such as a wireless overlay network system. Querying may occur through any suitable means. For example, the query may take place via a Subscriber Identification Module (SIM) Toolkit, Wireless Application Protocol (WAP) Push, Short Message Service (SMS), etc. The automatic position information may be requested as described above or may be transmitted at regular or non-regular intervals based on events such as a change of cells (i.e., handover, handoff, etc.).

In the method of FIG. 2, general location information may be determined before or after locator application 50 on node 16 establishes a connection with a database of location parameters. The steps shown at block 305 and 310 may also occur simultaneously.

The selection of the database of location parameters may depend on the nature of the service request received at 301. This selection may also depend on the nature of the services being provided. For example, if the service request is for directions to the nearest ATM, the communication node 16 may select an information source 54 containing a list of ATMs in the vicinity of the general location established at block 310.

At block 315, locator application 50 on node 16 receives specific category information. In the embodiment shown in FIG. 2, user 20, 30 is prompted to select a category by which a location will be specified. For example, the user may be prompted to select one or more categories such as, but not limited to: "intersection," "street name and number," "ATM", "gas stations", "train stations", "landmarks", "businesses", "highways", "highway exits" "mile markers" or "points of interest". These categories may also be combinations of one or more categories, for example "intersection with street address", "ATM with corresponding intersection", or "highway exit with highway mile marker."

In one embodiment of the invention, the category is indicated as part of the service request. A lack of response within a given time may be taken to indicate a default selection.

At block 320, locator application 50 on node 16 may select a set of location parameters based on the information received at 315. For example, in the embodiment shown in FIG. 2, if the user selected "intersection", this may indicate to locator application 50 that the location relevant to the device 12, 32 or of to the associated user 20, 30 of the device will be in the form of an intersection, (i.e. a pair of intersecting streets). This selection can then be used to further refine the search field. For example, when the VUI method is used as input, a grammar for the list of selections may be forwarded to the VRU server. The list of selections and its corresponding grammar may, in essence, be refined to include only those location parameters such as streets, ATMs, gas stations that are within, near, or around the general location information.

Additionally, the database of location parameters or the grammar may be dynamically generated. In such a case, the communication node 16 or locator application 50, after creating such a grammar, may upload the grammar to a memory location, a voice browser, or a VRU server, located either integral with or remote from the communication node 16.

Within the parameters set by the general location information, locator application 50 on node 16 may use the additional parameters selected at block 320 to refine a search field. For example, instead of maintaining in memory an entire virtual version of a map of the United States, only a map of the area corresponding to the general location information may be maintained. Alternatively, instead of maintaining a database listing all location parameters in the United States, only a database of location parameters falling nearby the general location information may be maintained.

Additionally, the search field may be further refined to include only the location parameters corresponding to the selected category. In the example where the selected parameters is based on the input "intersection," the set of location parameters and its corresponding grammar may be restricted to include only the set of intersecting streets.

At block 325, locator application 50 on node 16 may then prompt for user specified information to further refine the field. This user-specified information may be transmitted by communication network 14, 18, user 20, 30, communication node 16 or locator application 50. Alternatively, as described above at block 301, this specific information may have been sent automatically with the service request. Such prompts may be a series of questions and answers between the communication node, locator application 50 and/or user 20, 30 (via communication device 12, 32). This interaction may occur via either the VUI, DUI or GUI methods, as described above. For example, the communication node may prompt the user, via the communication device, to enter or speak the nearest street(s), a nearby address, a nearby landmark or a highway interchange to which the user would respond via the communication device (e.g. the user may respond with "LaSalle and Madison" or "25 South LaSalle" or "near the Chicago Board of Trade.") The user may then respond appropriately, for example, via device 12, 32. A lack of response within a given time may be taken to indicate a default selection.

Once the user-specified information is received by the node 16 or locator application 50, at block 330, locator application 50 or communication node 16 then compares this information (received at block 325) with the refined database of location parameters (determined at block 320). As stated above, the database of location parameters may include terms corresponding to a geographical location. Thus, at block 330, the communication node 16 or locator application 50 may compare the specific location information with the database of location parameters. Preferably, the database of location parameters may include a grammar of geographic and non-geographic terms, as disclosed above. (e.g., the communication node 16 would look for "LaSalle Street," "Madison Avenue" "25 South LaSalle Street" and/or "Chicago Board of Trade.")

Upon performing the comparison step of block 330, the communication node 16 can then determine the location relevant to the user 20, 30 (block 335). In one embodiment of the invention, this is accomplished by matching the specific location information responses with the database of location parameters. In one embodiment, this location may be the accurate location of the communication device 12, 32 and/or its associated user 20, 30. Alternatively, the location determined at block 335 may be a location that is relevant to the user or a point of interest (e.g. the location of a nearby airport).

Figure 3:
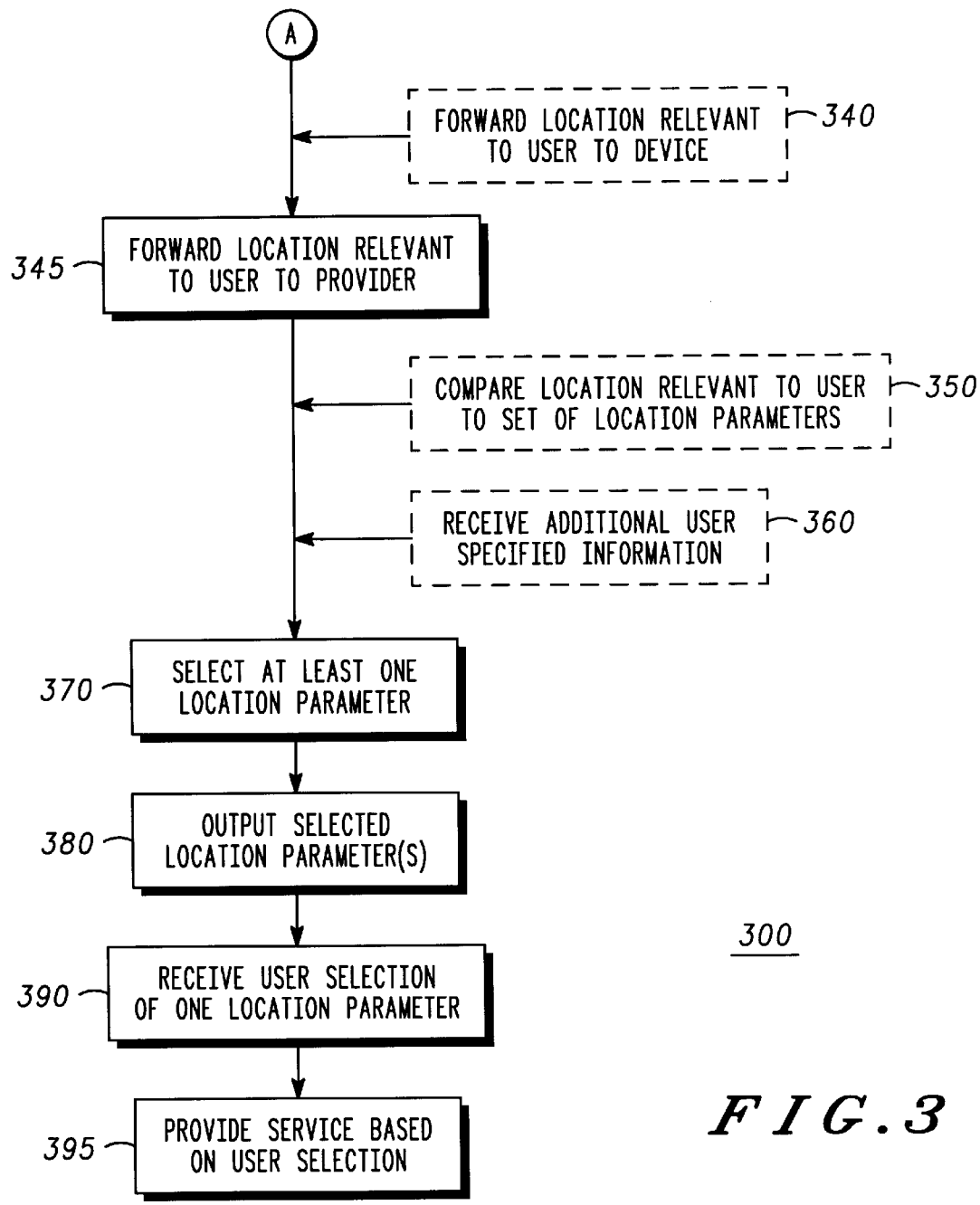
FIG. 3 is a flow diagram continuing the flow diagram FIG. 2.

Once the relevant location has been determined at block 335, additional services may be provided to the device 12, 32 and its associated user 20, 30 as described in FIG. 3.

FIG. 3 shows a flow diagram continuing an embodiment for providing a service to a communication device and its associated user in accordance with the present invention at 300. The embodiment of FIG. 3 may be used once a location relevant to the user has been located using the embodiment of FIG. 2.

In one embodiment of the invention, the communication node 16 or locator application 50 may forward the relevant location to the device 12, 32. This step may be an optional step that may occur when indicated at block 340. This location may then be output to the user 20, 30 in any suitable manner. Thus, in the above example, the communication node may output to the communication device, "You are at 25 South LaSalle Street, Chicago, Ill."

Whether or not this relevant location is provided to device 12, 32 and its associated user as indicated at block 340, additional services may also be imparted to the user from node 16 or locator application 50. Thus, as seen at block 345, the relevant location may be forwarded to a suitable service provider to provide additional services. These services may be provided to the user 20, 30 via device 12, 32 or via any other suitable means. The relevant location may be forwarded to communication node 16, locator application 50, communication networks 14, 18 or any other suitable service providers.

One embodiment of the invention then continues from block 345 to the step seen at block 370. Optional steps are indicated at blocks 350 and 360 and will be further described below.

Proceeding from block 345 to block 370, at block 370, the communication node 16 may then select at least one location parameter from the associated location parameters (e.g. selects at least one ATM). In one embodiment of the invention, the location parameter selected corresponds to all or a portion of the user responses determined at blocks 325, 350. The specific number of location parameters selected may be variable and dependent upon a number of factors. For example, the number of location parameters selected may be dependent upon a predetermined mile radius from the location of the communication device (e.g. only the location parameters of ATMs within 2 miles of the communication device are selected). Alternatively, the communication node 16 may be preprogrammed to return a specific number of selected location parameters (e.g. only the location parameters of the 10 ATMs nearby the communication device are selected).

Before communication node 16 selects at least one location parameter at block 370, the database of location parameters may optionally be further refined using the steps described at blocks 350, 360. In such cases, at block 350, communication node 16 compares the location relevant to the user 20, 30 (determined at block 335) with the set of location parameters chosen at 305 and refined for a first time at 320. Then, at block 360, the user is given one or more additional opportunities to specify information for refining the parameters. For example, the user may give a response at block 360 which narrows the parameters to the location parameters of the first three ATMs within a four-block radius of the accurate location of the communication device 12, 32.

In any event, at block 370, the communication node 16 selects at least one location parameter to be output to the device 12, 32 and its associated user. The selected location parameter(s) are output at block 380. The selected location parameters may be output in any suitable manner, for example, to the user 20, 30 via device 12, 32. Alternatively, the selected parameters may be output to a printer designated by the user or may be e-mailed to another device such as the user's e-mail server. Thus, in the illustrated example, the communication node 12, 32 may output to the communication device, "There is a Northern Trust ATM located at 50 South LaSalle Street. There is a Northern Trust ATM located at 10 East Oak Street. There is a Northern Trust ATM located at 15 South Wacker Drive."

At block 390, the selected location parameters may be further refined by the user so that only one location parameter is chosen. In one embodiment, the user 20, 30 selects one location parameter from the selected location parameters provided at 380. The user may select the location parameter via device 12, 32 or via any other suitable means.

At block 395, additional services may be provided based on the selection made at 380. These services may be provided to the user 20, 30 via device 12, 32 or via any other suitable means. These services may be provided by communication node 16, locator application 50, communication networks 14, 18 or any other suitable service providers.

For purposes of illustrating the method described in FIGS. 2 and 3, Examples A and B are provided below.

EXAMPLE A

Bob is walking in downtown Chicago and passes a card shop. He decides to buy a card for his spouse. Inside the shop, he discovers he has left his wallet at home. Using his cell phone, Bob places a voice call to a communication node to find the ATM nearest to him, (e.g. nearest to his current location). He says "Nearest ATMs to here" and the node receives this as Bob's service request (block 301). The node forwards the request to an ATM Locator application that can process Bob's location, e.g. an application that can process cell and/or sector ID information. The application obtains Bob's location from Bob's cellular service provider and determines that he is in a given cell and sector (block 310). The application also communicates with an information source that can provide it with additional information such as a list of streets and ATMs near, around, within, or corresponding to Bob's location (block 305). The information source then provides this information to the application. The application prompts Bob for a category of locations and Bob's response, "Intersections", is received by the application (block 315). The application sends a grammar corresponding to, for example, the list of streets, to the voice gateway on the communication node (block 320). Then the application or node prompts Bob to specify a location such as an intersection and Bob responds with "Ohio and State" (block 325). The application, through communication with the communication node and the information source verifies that "Ohio and State" is an intersection corresponding to Bob's general location (block 330) and accurately and uniquely determines Bob's location (block 335). The application then forwards Bob's accurate location (e.g. 25 W. Ohio Street, Chicago, Ill.) to a service provider (block 345) to obtain the closest ATMs. The application compares Bob's location to the list of ATMs provided by the service provider (block 350), determines the closest list of ATMs (block 370). The application presents the information corresponding the closest ATMs to Bob via the communication node and Bob's cell phone (block 380), e.g. "the nearest ATM is at the branch of The Northern Trust Bank located at 10 West Oak Street, Chicago, Ill. The next nearest ATM is at 50 South LaSalle Street, Chicago, Ill." Bob selects the ATM at 10 West Oak Street and this selection is received by the application (block 390). The service provider then provides Bob with information about the ATM use fee at the 10 West Oak branch and the hours that the branch is open (block 395).

EXAMPLE B

Sunil is at a business meeting in Chicago, Ill., and is planning to fly back to Florida in a few hours. The meeting is running late and Sunil is in a hurry to get to the O'Hare airport. Sunil is not confident he knows the directions to the airport. So, on the way to the airport Sunil places a voice call to a directions service, e.g. a communication node that provides interactive voice-based services. He asks for "directions from here to the airport". The node receives the request and forwards it to a directions application (block 301). The directions application establishes communication with an information source that can generate turn-by-turn directions and has point-of-interest information such as airports (block 305). Based on the command "directions from here to the airport", the application determines that the starting location is "here", e.g. Sunil's current location, and that the category for the destination location is a point-of-interest in the form of an "airport", e.g. an airport nearby (block 315). The application obtains the starting location from the GPS unit in Sunil's phone. Since Sunil is looking for directions to a nearby airport, the applications uses Sunil's current location obtained from the GPS unit in Sunil's phone as the general location (block 310). The application then determines the list of closest relevant airports to the general location e.g. the O'Hare airport, the Midway airport, the Palwaukee airport, and the Meigs Field airport, through communication with the information source (block 320). The application then prioritizes the list of airports according to the distance from Sunil's current location. The application also sends a grammar corresponding to the list of airports to the voice gateway on the communication node (block 320). The application prompts Sunil to make a selection via the communication node and Sunil's cell phone. Sunil selects "O'Hare" and the application obtains the selection (block 325). The application compares "O'Hare" to the selected list of airports (block 330). The application then verifies the selection and obtains the address pertaining to "O'Hare" (block 335). The application forwards Sunil's location as the starting location and the address of "O'Hare" as the destination location to the information source to request turn-by-turn directions. The information source generates the turn-by-turn directions and forwards it to the application. The application presents the information to Sunil via the communication node and Sunil's cell phone (block 390).

Referring now to FIG. 4, an exemplary block diagram of another embodiment of a communication system having the capability to accurately locate a communication device and its associated user is provided at 200. The communication system can implement the methods described in FIGS. 3 and 4 above.

The communication system 200 generally includes one or more communication devices 201, 202, 203, 204, 205 (five being shown), an electronic network 206, and one or more information sources (e.g., content providers 208, 221 (two being shown) and data and voice markup language servers 209, 251, 253, 257).

The user can access the electronic network 206 by dialing a single direct access telephone number (e.g., a foreign telephone number, a local telephone number, or a toll-free telephone number or PBX) from the communication device 20, 301. The user can also access the electronic network 206 from the communication device 202 via the Internet 220 or WWW, from the communication device 203 via a paging network 211, or from the communication device 205 via a LAN, a WAN, an e-mail connection or in any other similar manner.

As shown in FIG. 4, the electronic network 206 includes a telecommunication network 210 and a communication node 212. The telecommunication network 210 is preferably connected to the communication node 212 via a high-speed data link, such as, for example, a T1 telephone line, a LAN, a WAN or a VOIP network. The telecommunication network 210 preferably includes a PSTN 214 and a carrier network 216. The telecommunication network 210 can also include, for example, international or local exchange networks, cable TV networks, inter-exchange carrier or long distance carrier networks, cellular networks (e.g., mobile switching centers), PBXs, satellite systems, wireless data networks and other switching centers such as conventional or trunked radio systems (not shown), etc. The electronic network 206 can also include additional telecommunication networks, such as, for example, a wireless data network 207.

The PSTN 214 can include various types of communication equipment, such as, for example, ATM networks, Fiber Distributed Data networks (FDDI), T1 lines, cable TV networks, VOIP networks and the like. The carrier network 216 generally includes a telephone switching system or central office 218.

It will be recognized that the carrier network 216 can be any suitable system that can route calls to the communication node 212, and the central office 218 can be any suitable wire-line or wireless switching system.

The communication node 212 is preferably configured to receive and process incoming calls from the carrier network 216 and the Internet 220. The communication node 212 can receive and process pages from the paging network 211 and can also receive and process messages (e.g., e-mails) from the LAN, WAN, wireless data or e-mail system 213.

When a user dials into the electronic network 206 from the communication device 201, the carrier network 216 routes the incoming call from the PSTN 214 to the communication node 212 over one or more telephone lines or trunks. The incoming calls preferably enter the carrier network 216 through one or more "888" or "800" Inward Wide Area Telecommunications Services trunk lines, local exchange or long distance trunk lines. It is also contemplated that the incoming calls can be received from a cable, cellular or VOIP network or any other suitable system.

The communication node 212 answers the incoming call from the carrier network 216 and retrieves an appropriate announcement (e.g., a welcome greeting) from a database, server or browser. The communication node 212 then plays the announcement to the caller. In response to audio inputs from the user, the communication node 212 retrieves information from a destination or database of one or more of the information sources, such as the content providers 208, 221 or the markup language servers 209, 251, 253, 257. After the communication node 212 receives the information, it provides a response to the user based upon the retrieved information.

The communication node 212 can provide various dialog voice personalities (e.g., a female voice, a male voice, etc.), and can implement various grammars (e.g., vocabulary) to detect and respond to the audio inputs from the user. In addition, the communication node 212 can automatically select various speech recognition models (e.g., English, Spanish or English accent models) based upon a user's profile, communication device and/or speech patterns. The communication node 212 can also allow the user to select a particular speech recognition model.

When a user accesses the electronic network 206 from a communication device 201, 202, 203, 204, 205 registered with the system (e.g., home telephone, work telephone, cellular telephone, etc.), the communication node 212 can by-pass a user screening option and automatically identify the user (or the type of communication device) through the use of ANI or CLI. After the communication node 212 verifies the call, the communication node 212 provides a greeting (e.g., "Hi, this is your personal agent, Mya. Welcome Bob. How may I help you?"). The communication node 212 then enters into a dialogue with the user, and the user can select a variety of services offered by the communication node 212.

When the user accesses the electronic network 206 from a communication device not registered with the system (e.g., a payphone, a telephone of a non-user, etc.), the communication node 212 answers the call and prompts the user to enter his or her name and/or a personal identification number (PIN) using voice commands or DTMF signals. The communication node 212 can also utilize speaker verification to identify the particular speech pattern of the user. If the communication node 212 authorizes the user to access the system, the communication node 212 provides a personal greeting to the user (e.g., "Hi, this is your personal agent, Mya. Welcome Ann. How may I help you?"). The communication node 212 then enters into a dialogue with the user, and the user can select various services offered by the communication node 212. If the name and/or PIN of the user cannot be recognized or verified by the communication node 212, the user will be routed to a customer service representative.

Once the user has accessed the communication system 200, the user may implement a wide variety of services and features by using voice commands, such as, for example, voice dialing, voice paging, facsimiles, caller announcements, voice mails, reminders, call forwarding, call recording, content information (e.g., newspapers, etc.), read e-mail, read calendars, read "to-do" lists, banking, e-commerce. The communication system 200 can place outbound calls and pages to business and personal parties or contacts (e.g., friends, clients, business associates, family members, etc.) in response to DTMF signals or voice commands. The calls can be routed through a telephone or electronic network to the selected party and the pagers can be sent to a selected party via a paging system. The communication system 200 can also receive calls routed through a telephone or electronic network.

As shown in FIG. 4, the communication node 212 preferably includes a telephone switch 230, a voice or audio recognition (VRU) client 232, a VRU server 234, a controller or call control unit 236, an Operation and Maintenance Office or a billing server unit 238, a LAN 240, an application server unit 242, a database server unit 244, a gateway server or router firewall server unit 246, a VOIP unit 248, a voice browser 250, a voice markup language server 251, a messaging server 255 and a data markup language server 253. Although the communication node 212 is shown as being constructed with various types of independent and separate units or devices, the communication node 212 can be implemented by one or more integrated circuits, microprocessors, microcontrollers or computers which may be programmed to execute the operations or functions equivalent to those performed by the devices or units shown. It will also be recognized that the communication node 212 can be carried out in the form of hardware components and circuit designs and/or software or computer programs.

The communication node 212 can be located in various geographic locations throughout the world or the United States (e.g., Chicago, Ill.). The communication node 212 can be operated by one or more carriers (e.g., Sprint, Qwest, MCI, etc.) or independent service providers (e.g., Motorola, Inc.).

The communication node 212 can be integrated with the carrier network 216 or can be located remote from the carrier network 216. It is also contemplated that the communication node 212 may be integrated into a communication device, such as, for example, a wire-line or wireless telephone, a radio device, a PC, a PDA, a PIM, etc., and can be programmed to connect or link directly to an information source.

The communication node 212 can also be configured as a standalone system to allow users to dial directly into the communication node 212 via a direct access telephone number. In addition, the communication node 212 may comprise a telephony switch (e.g., a PBX or Centrix unit), an enterprise network or a LAN. In this configuration, the communication system 200 can be implemented to automatically connect a user to the communication node 212 when the user accesses a communication device.

When the telephone switch 230 receives an incoming call from the carrier network 216, the call control unit 236 sets up a connection in the telephone switch 230 to the VRU client 232. The communication node 212 then enters into a dialog with the user regarding various services and functions. The VRU client 232 preferably generates pre-recorded voice announcements and/or messages to prompt the user to provide inputs to the communication node 212 using voice commands or DTMF signals. In response to the inputs from the user, the communication node 212 retrieves information from a destination of one of the information sources and provides outputs to the user.

The telephone switch 230 is preferably connected to the VRU client 232, the VOIP unit 248 and the LAN 240. The telephone switch 230 receives incoming calls from the carrier network 216. The telephone switch 230 also receives incoming calls from the communication device 202 routed over the Internet 220 via the VOIP unit 248. The telephone switch 230 also receives messages and pages from communication devices 203, 205, respectively. The telephone switch 230 is preferably a digital cross-connect switch, Model LNX, available from Excel Switching Corporation, Hyannis, Mass. It will be recognized that the telephone switch 230 can be any suitable switch.

The VRU client 232 is preferably connected to the VRU server 234 and the LAN 240. The VRU client 232 processes voice communications, DTMF signals, pages and messages (e.g., e-mails). Upon receiving voice communications, the VRU client 232 routes the speech communications to the VRU server 234. When the VRU client 232 detects DTMF signals, it sends a command to the call control unit 236. It will be recognized that the VRU client 232 can be integrated with the VRU server 234.

The VRU client 232 preferably comprises a PC, such as, for example, a Windows NT compatible PC, with hardware capable of connecting individual telephone lines directly to the telephone switch 230 or carrier network 216. The VRU client 232 preferably includes a microprocessor, random access memory, read-only memory, a T1 or ISDN interface board, and one or more voice communication processing boards (not shown). The voice communication processing boards are preferably Dialogic boards, Antares Model, available from Dialogic Corporation, Parsippany, N.J. The voice communication boards may include a voice recognition engine having a vocabulary for detecting a speech pattern. The voice recognition engine is preferably a RecServer software package, available from Nuance Communications, Menlo Park, Calif.

The VRU client 232 can also include an echo canceller (not shown) to reduce or cancel TTS or playback echoes transmitted from the PSTN 214 due to hybrid impedance mismatches. The echo canceller is preferably included in an Antares Board Support Package, also available from Dialogic.

The call control unit 236 is preferably connected to the LAN 240, and sets up the telephone switch 230 to connect incoming calls to the VRU client 232. The call control unit 236 also sets up incoming calls or pages to the communication node 212 over the Internet 220 and pages and messages sent from the communication devices 203, 205 via the paging network 211 and e-mail system 213, respectively. The control call unit 236 preferably comprises a PC, such as, for example, a Windows NT compatible PC.

The LAN 240 allows the various components and devices of the communication node 212 to communicate with each other via twisted pair, fiber optic, coaxial cables or the like. The LAN 240 may use Ethernet, Token Ring or other suitable types of protocols. The LAN 240 is preferably a 100 Megabit per second Ethernet switch, available from Cisco Systems, San Jose, Calif., and can comprise any suitable network system. The communication node 212 may include a plurality of LANs.

The VRU server 234 is connected to the VRU client 232 and the LAN 240. The VRU server 234 receives voice communications from the user via the VRU client 232. The VRU server 234 processes the voice communications and compares the voice communications against a vocabulary or grammar stored in the database server unit 244 or a similar memory device. The VRU server 234 provides output signals, representing the result of the voice communications processing, to the LAN 240. The LAN 240 routes the output signal to the call control unit 236, the application server unit 242 and/or the voice browser 250. The communication node 212 then performs a specific function associated with the output signals.

The VRU server 234 preferably includes a TTS unit 252, an automatic speech recognition (ASR) unit 254, and a STT unit 256. The TTS unit 252 receives textual data or information (e.g., e-mail, web pages, documents, files, etc.) from the application server unit 242, the database server unit 244, the call control unit 236, the gateway server unit 246, the application server unit 242 and the voice browser 250. The TTS unit 252 processes the textual information and converts it to voice data or information.

The TTS unit 252 can provide information to the VRU client 232, which reads or plays the information to the user. For example, when the user requests information (e.g., news updates, stock information, traffic conditions, etc.), the communication node 212 retrieves the desired information (e.g., textual information) from a destination of the one or more of the information sources and converts the information via the TTS unit 252 into a response.

The response is then sent to the VRU client 232. The VRU client 232 processes the response and reads an audio message to the user based upon the response. It is contemplated that the VRU server 234 can read the audio message to the user using human recorded speech or synthesized speech. The TTS unit 252 is preferably a TTS 20, 3000 software package, available from Lernout and Hauspie Speech Product NV, Burlington, Mass.

The ASR unit 254 provides speaker dependent or independent automatic voice recognition of voice communications from the user. It is contemplated that the ASR unit 254 can include speaker dependent voice recognition. The ASR unit 254 processes the voice communications to determine whether a word or a speech pattern matches any of the grammars or vocabulary stored in the database server unit 244 or downloaded from the voice browser 250. When the ASR unit 254 identifies a selected speech pattern of the voice communications, the ASR unit 254 sends an output signal to implement the specific function associated with the recognized speech pattern. The ASR unit 254 is preferably a speaker independent voice recognition software package, RecServer Model, also available from Nuance Communications. It is contemplated that the ASR unit 254 can be any suitable voice recognition unit to detect voice communications.

The STT unit 256 receives voice communications and converts the voice communications to textual information (e.g., a text message). The textual information can be sent or routed to the communication devices 201, 202, 203, 204, 205, the content providers 208, 221, the markup language servers 209, 251, 253, 257, the voice browser 250 and the application server unit 242. The STT unit 256 is preferably a Naturally Speaking software package, available from Dragon Systems, Newton, Mass.

The VOIP unit 248 is preferably connected to the telephone switch 230 and the LAN 240. The VOIP unit 248 allows a user to access the communication node 212 via the Internet 220 or VOIP public network using voice commands. The VOIP unit 248 can receive VOIP protocols (e.g., H.323 protocols) transmitted over the Internet 220 or Intranet, and can convert the VOIP protocols to voice information or data. The voice information can then be read to the user via the VRU client 232. The VOIP unit 248 can also receive voice communications from the user and convert the voice communications to a VOIP protocol that can be transmitted over the Internet 220. The VOIP unit 248 is preferably a Voice Net software package, also available from Dialogic Corporation. It will be recognized that the VOIP unit 248 can be incorporated into a communication device.

The communication node 212 also includes a detection unit 260. The detection unit 260 is preferably a phrase or key word spotter unit, detecting incoming audio inputs or communications or DTMF signals from the user. The detection unit 260 is preferably incorporated into the telephone switch 230, but can be incorporated into the VRU client 232, the carrier network 216 or the VRU server 234. The detection unit 260 is preferably included in a RecServer software package, also available from Nuance Communications.

The detection unit 260 records the audio inputs from the user and compares the audio inputs to the vocabulary or grammar stored in the database server unit 244. The detection unit 260 continuously monitors the user's audio inputs for a key phase or word after the user is connected to the node 212. When the detection unit 260 detects the key phrase or word, the VRU client 232 plays a pre-recorded message to the user. The VRU client 232 then responds to the audio inputs provided by the user.

The billing server unit 238 is preferably connected to the LAN 240. The billing server unit 238 can record information about the use of the communication node 212 by a user (e.g., length of calls, features accessed by the user, etc.). Upon completion of a call by a user, the call control unit 236 sends information to the billing server unit 238. The billing server unit 238 can subsequently process the information in order to prepare customer bills. The billing server unit 238 can use the ANI or CLI of the communication device to properly bill the user. The billing server unit 238 preferably comprises a Windows NT compatible PC.

The gateway server unit 246 is preferably connected to the LAN 240 and the Internet 220. The gateway server unit 246 provides access to the content provider 221 and the voice markup language server 257 via the Internet 220. The gateway server unit 246 allows users to access the communication node 212 from the communication device 202 via the Internet 220. The gateway server unit 246 can function as a firewall to control access to the communication node 212 to authorized users. The gateway server unit 246 is preferably a Cisco Router, also available from Cisco Systems.

The database server unit 244 is preferably connected to the LAN 240. The database server unit 244 preferably includes a plurality of storage areas to store information relating to users, such as, for example, speech vocabularies, dialogs, personalities, user entered information, and other information. Preferably, the database server unit 244 stores a personal file or address book. The personal address book can contain information required for the operation of the communication system 200, including user reference numbers, personal access codes, personal account information, contact's addresses, telephone numbers, etc. The database server unit 244 is preferably a PC, such as, for example, a Windows NT compatible PC.

The application server unit 242 is preferably connected to the LAN 240 and the content provider 208. The application server unit 242 allows the communication node 212 to access information from a destination of the information sources, such as the content providers 208, 221 and the markup language servers 209, 251, 253, 257. For example, the application server unit 242 can retrieve information (e.g., weather reports, stock information, traffic reports, restaurants, flower shops, banks, calendars, "to-do" lists, e-commerce, etc.) from a destination of the information sources. This application server unit 242 may include Starfish Software to provide the address book, calendar and to-do lists, and to allow the user to organize information. The application server unit 242 processes the retrieved information and provides the information to the VRU server 234 and the voice browser 250. The VRU server 234 can provide an audio announcement to the user based upon the information using TTS synthesizing or human recorded voice. The application server unit 242 can also send tasks or requests (e.g., transactional information) received from the user to the information sources (e.g., a request to place an order for a pizza). The application server unit 242 can further receive user inputs from the VRU server 234 based upon a speech recognition output. The application server unit 242 is preferably a PC.

The voice markup language server 251 is preferably connected to the LAN 240. The voice markup language server 251 can include a database, scripts and markup language documents or pages. The voice markup language server 251 is preferably a PC, such as, for example, a Windows NT compatible PC. It will also be recognized that the voice markup language server 251 can be an Internet server (e.g., a Sun Microsystems server).

The messaging server 255 is preferably connected to the LAN 240, the paging network 211, an e-mail system 213 and a short message system (SMS) 290. The messaging server 255 routes pages between the LAN 240 and the paging network 211. The messaging server 255 is preferably a PC, such as, for example, a Windows NT compatible PC. The messaging server 255 can also provide direct storage. It is contemplated that the messaging server 255 can reside externally from the communication node 212.

The voice browser 250 is preferably connected to the LAN 240. The voice browser 250 preferably receives information from the markup language servers 209, 251, 253, 257, the database server unit 244 and the content providers 208, 221. In response to voice commands or DTMF signals, the voice browser 250 generates a content request (e.g., an electronic address) to navigate to a destination of one or more of the information sources. The content request can use at least a portion of a Uniform Resource Locator, an Internet Protocol, a page request, or e-mail.

After the voice browser 250 is connected to an information source, the voice browser 250 preferably uses a Transmission Control Protocol/Internet Protocol connection to pass requests to the information source. The information source responds to the requests, sending at least a portion of the requested information, represented in electronic form, to the voice browser 250. The information can be stored in a database, and can include text content, markup language document or pages, non-text content, dialogs, audio sample data, recognition grammars, etc. The voice browser 250 then parses and interprets the information, further described below. The voice browser 250 can be integrated into the communication devices 201, 202, 203, 204, 205.

As shown in FIG. 4, the content provider 208 is connected to the application server unit 242 of the communication node 212, and the content provider 221 is connected to the gateway server unit 246 of the communication node 212 via the Internet 220. The content providers 208, 221 can store various content information, such as news, banking, commerce, weather, traffic conditions, etc. The content providers 208, 221 can include a server to operate WWW pages or documents in the form of a markup language. The content providers 208, 221 can also include a database, scripts and/or markup language documents or pages. The scripts can include images, audio, grammars, computer programs, etc. The content providers 208, 221 execute suitable server software to send requested information to the voice browser 250.

The voice mail unit 274 is preferably connected to the telephone switch 203 and the LAN 240. The voice mail unit 274 can store voice mail messages from parties trying to send messages to the communication node 212. When a user accesses the electronic network 206, the voice mail unit 274 can notify the user of new and stored messages. The user can access the messages to play, delete, store and forward the messages. When the user accesses a message, the message can be read to the user or can be displayed as textual information on a communication device (e.g., a pager, a SMS 290, or a PDA, etc.). The user can also access and operate external messages or mail systems remote from the electronic network 206.

The FAX server unit 272 is preferably connected to the telephone switch 230 and the LAN 240. The FAX server unit 272 receivers and stores facsimile information sent via the electronic network 206 or the carrier network 216. Users can access the facsimile information to play, store, delete, and forward the information. The facsimile information can be read via the TTS unit 252 or can be displayed as textual information on a suitable communication device. The FAX server unit 272 preferably comprises a PC, such as, for example, a Windows NT compatible PC or a Dialogue Fax Server.

Further information regarding communication system 200 is disclosed in U.S. patent application Ser. No. 09/141,485, entitled "Telecommunication System and Methods Therefor," filed Aug. 27, 1998, the entire disclosure of which is incorporated herein by reference.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of determining a location relevant to a user of a communication device, comprising:

determining general location information of the location relevant to the user;

determining a list of location parameters from the general location information;

determining specific location information of the communication device; and determining the location relevant to the user by comparing the list of location parameters with the specific location information, wherein the list of location parameters comprises a dynamically generated list of location parameters, the location parameters at a given position in relation to the general location information.

2. The method of claim 1, further comprising:

ordering the list of location parameters based upon the given position in relation to the general location information.

3. A method of determining a location relevant to a user of a communication device, comprising:

determining general location information of the location relevant to the user;

determining a list of location parameters from the general location information;

determining specific location information of the communication device;

determining the location relevant to the user by comparing the list of location parameters with the specific location information;

receiving a selection list corresponding to the list of location parameters;

receiving a selection;

matching the selection with the selection list to determine a matched selection;

verifying the matched selection; and transmitting the matched selection.

4. The method of claim 3, wherein the selection list is selected from the group consisting of:

a grammar, a static grammar, and a grammar created dynamically from the list of location parameters.

5. The method of claim 3, further comprising:

requesting a category of specific location information; and receiving the category of specific location information.

6. The method of claim 5 further comprising:

receiving a second selection list corresponding to a list of categories of specific location information:

receiving a second selection;

matching the second selection with the second selection list to determine a second matched selection;

verifying the second matched selection; and transmitting the second matched selection.

7. The method of claim 6, wherein the second selection list is selected from the group consisting of:

a grammar, a static grammar, and a grammar created dynamically from the list of location parameters.

8. The method of claim 6, further comprising:

refining the list of location parameters based upon the second matched selection.

9. A system for determining a location relevant to a user of a communication device, comprising:

computer readable program code to receive a service request;

computer readable program code to communicate with a database of location parameters;

computer readable program code to determine general location information of the location relevant to the user;

computer readable program code to receive specific location information from the communication device; and computer readable program code to compare the general location information and the specific location information with the database of location parameters.

10. A program for determining a location relevant to a user of a communication device, comprising:

computer readable program code to receive a service request;

computer readable program code to communicate with a database of location parameters;

computer readable program code to determine general location information of the location relevant to the user;

computer readable program code to receive specific location information from the communication device; and computer readable program code to compare the general location information and the specific location information with the database of location parameters.

* * * * *